(12) United States Patent
Lawson

(10) Patent No.: US 11,835,368 B2
(45) Date of Patent: Dec. 5, 2023

(54) SPILL RESISTANT BEVERAGE CONTAINER ASSEMBLY

(71) Applicant: Stephanie Lawson, North Las Vegas, NV (US)

(72) Inventor: Stephanie Lawson, North Las Vegas, NV (US)

(*) Notice: Subject to any disclaimer, the term of this patent is extended or adjusted under 35 U.S.C. 154(b) by 903 days.

(21) Appl. No.: 16/675,661

(22) Filed: Nov. 6, 2019

(65) Prior Publication Data
US 2021/0127873 A1    May 6, 2021

(51) Int. Cl.
*G01D 5/00* (2006.01)
*A47G 19/22* (2006.01)
*B65D 43/02* (2006.01)
*B65D 47/06* (2006.01)
*H04W 4/38* (2018.01)
*A47J 41/00* (2006.01)

(52) U.S. Cl.
CPC ........... *G01D 5/00* (2013.01); *A47G 19/2272* (2013.01); *A47G 19/2288* (2013.01); *B65D 43/02* (2013.01); *B65D 47/06* (2013.01); *H04W 4/38* (2018.02); *A47G 19/22* (2013.01); *A47J 41/0055* (2013.01); *B65D 2543/00046* (2013.01)

(58) Field of Classification Search
CPC .... B65D 47/06; B65D 47/032; B65D 47/265; B65D 51/24; A47G 19/2272; G01C 19/20
USPC .... 222/52, 63, 566–570; 220/703, 711, 713, 220/717, 725, 726, 727
See application file for complete search history.

(56) References Cited

U.S. PATENT DOCUMENTS

| | | | | |
|---|---|---|---|---|
| 6,102,244 A | * | 8/2000 | Kuwano | A47G 19/2272 220/711 |
| 6,736,295 B2 | * | 5/2004 | Lin | A47J 41/0016 222/475.1 |
| 7,416,093 B2 | | 8/2008 | Lin | |
| D669,736 S | * | 10/2012 | Bodum | D7/532 |
| 9,808,102 B2 | | 11/2017 | Pinelli | |
| D829,506 S | * | 10/2018 | Breit | D9/567 |
| 10,561,262 B2 | * | 2/2020 | Phan | A47G 19/2272 |
| D897,156 S | * | 9/2020 | Nucci | D7/509 |
| 10,926,925 B2 | * | 2/2021 | Seiders | B65D 55/16 |
| 11,161,654 B2 | * | 11/2021 | Eisner | B65D 47/265 |
| 2002/0108959 A1 | | 8/2002 | Pollock | |
| 2005/0029265 A1 | * | 2/2005 | Morgan | A47G 19/2288 220/254.9 |
| 2005/0174882 A1 | * | 8/2005 | Krasne | A47J 43/042 366/249 |
| 2008/0262469 A1 | * | 10/2008 | Brister | A61M 5/1723 604/246 |

(Continued)

*Primary Examiner* — Lien M Ngo

(57) ABSTRACT

A spill resistant beverage container assembly for spill free beverage consumption includes a cup and a lid that is complementary to a top of the cup so that the lid is positioned to be selectively coupled to the cup to sealably close the top. The lid comprises a sidewall that is coupled to and extends between an upper plate and a lower plate to define an interior space. An aperture is positioned in the lid proximate to a circumference of the lid. A detection and access module that is coupled to the lid and positioned in the interior space is configured to detect motion in proximity to the aperture, positioning the detection and access module to open the aperture so that the aperture is configured to allow sipping of a beverage that is positioned in the cup.

18 Claims, 5 Drawing Sheets

(56) References Cited

U.S. PATENT DOCUMENTS

2014/0312077 A1\* 10/2014 Tajima ................ A47J 41/0022
   222/552
2016/0264431 A1   9/2016 Gilbert
2016/0286993 A1   10/2016 Pau
2018/0305091 A1\* 10/2018 Krafft ................ A47G 19/2272

\* cited by examiner

SPILL RESISTANT BEVERAGE CONTAINER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relate to beverage container assemblies and more particularly pertain to a new beverage container assembly for spill free beverage consumption.

BRIEF SUMMARY OF THE INVENTION

An embodiment of the disclosure meets the needs presented above by generally comprising a cup and a lid that is complementary to a top of the cup so that the lid is positioned to be selectively coupled to the cup to sealably close the top. The lid comprises a sidewall that is coupled to and extends between an upper plate and a lower plate to define an interior space. An aperture is positioned in the lid proximate to a circumference of the lid. A detection and access module that is coupled to the lid and positioned in the interior space is configured to detect motion in proximity to the aperture, positioning the detection and access module to open the aperture so that the aperture is configured to allow sipping of a beverage that is positioned in the cup.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
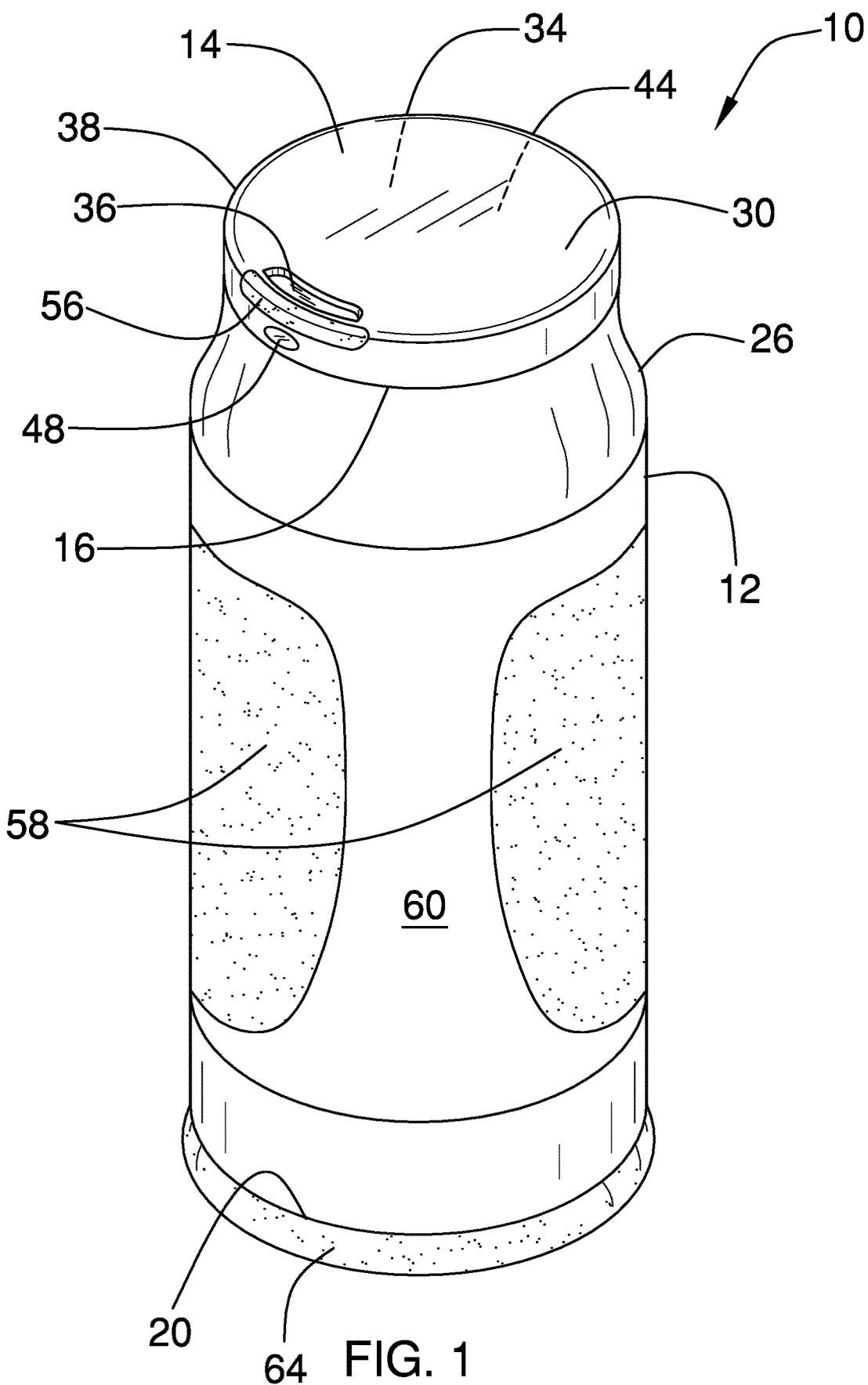
FIG. 1 is an isometric perspective view of a spill resistant beverage container assembly according to an embodiment of the disclosure.
Figure 2:
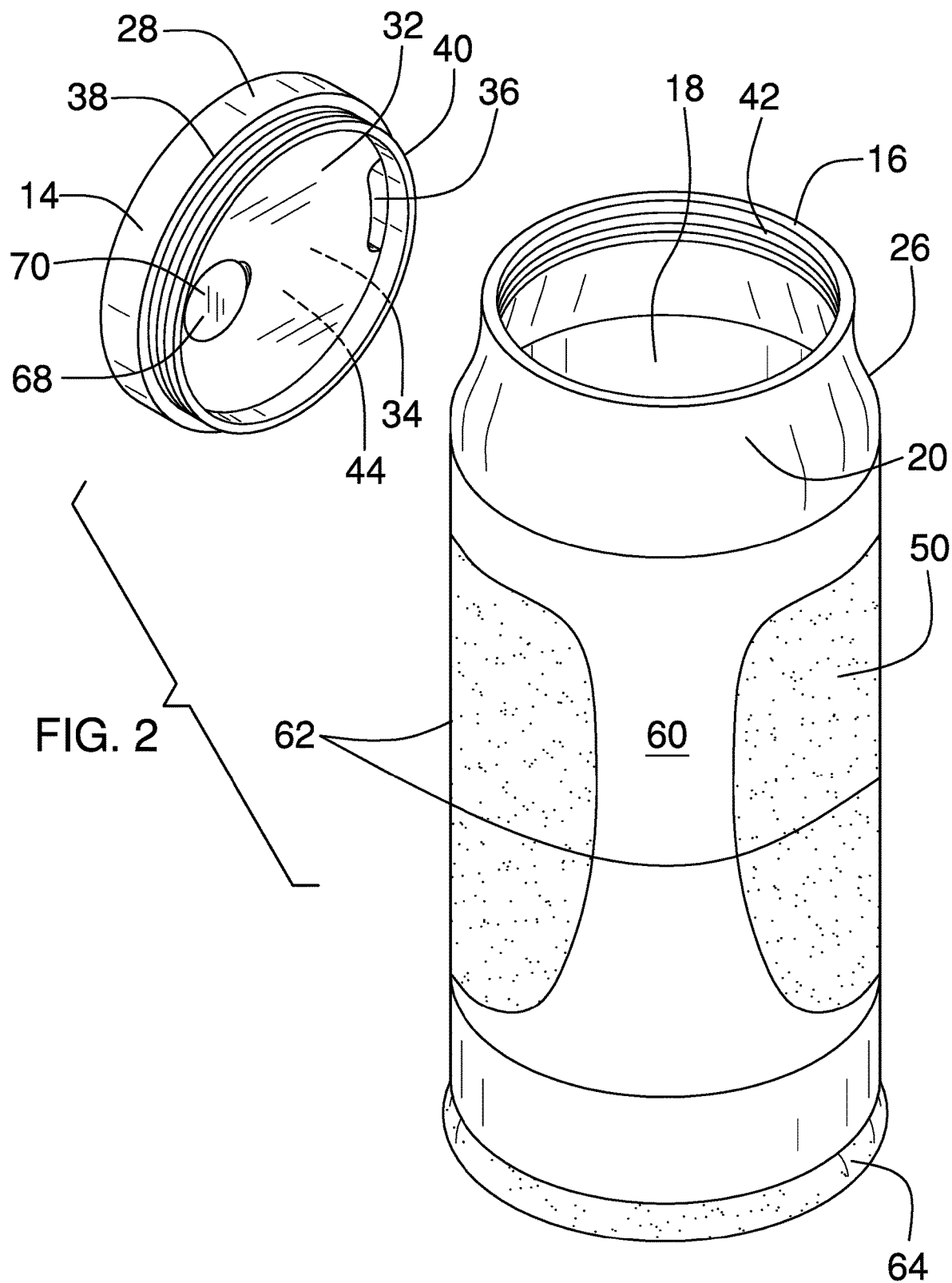
FIG. 2 is an isometric perspective view of an embodiment of the disclosure.
Figure 3:
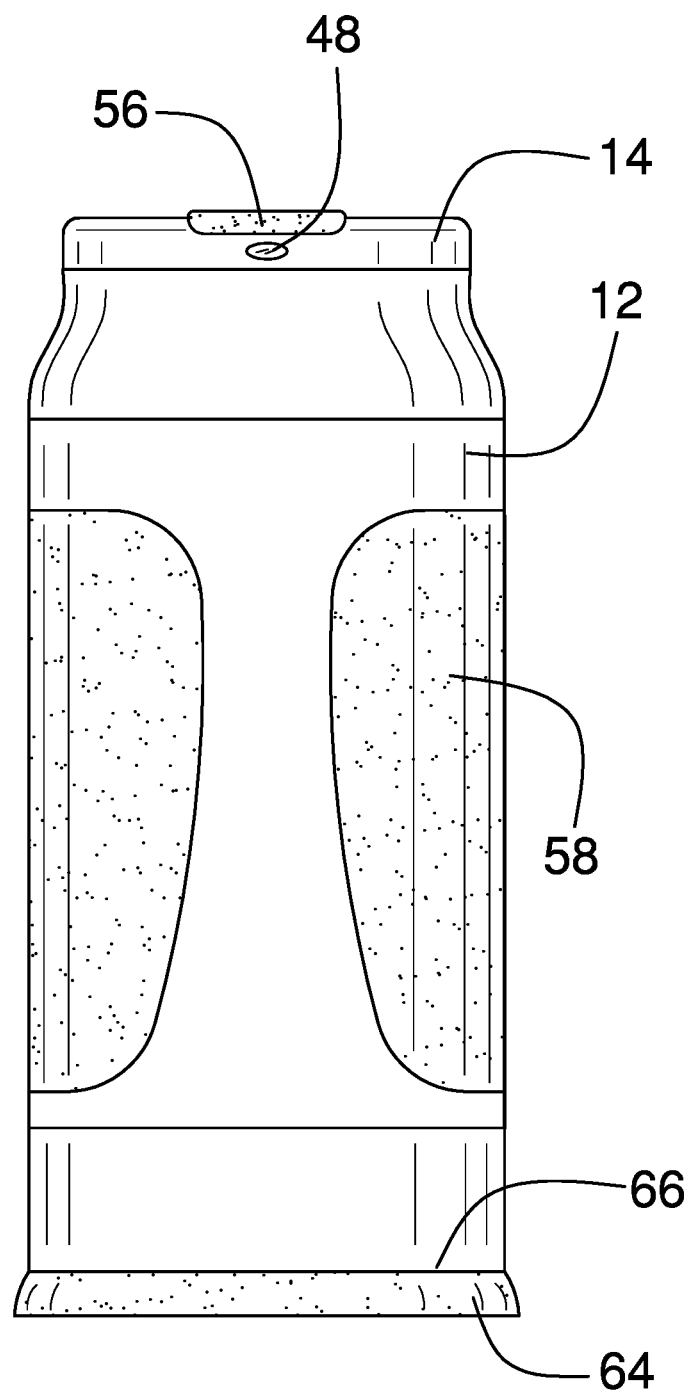
FIG. 3 is a front view of an embodiment of the disclosure.
Figure 4:
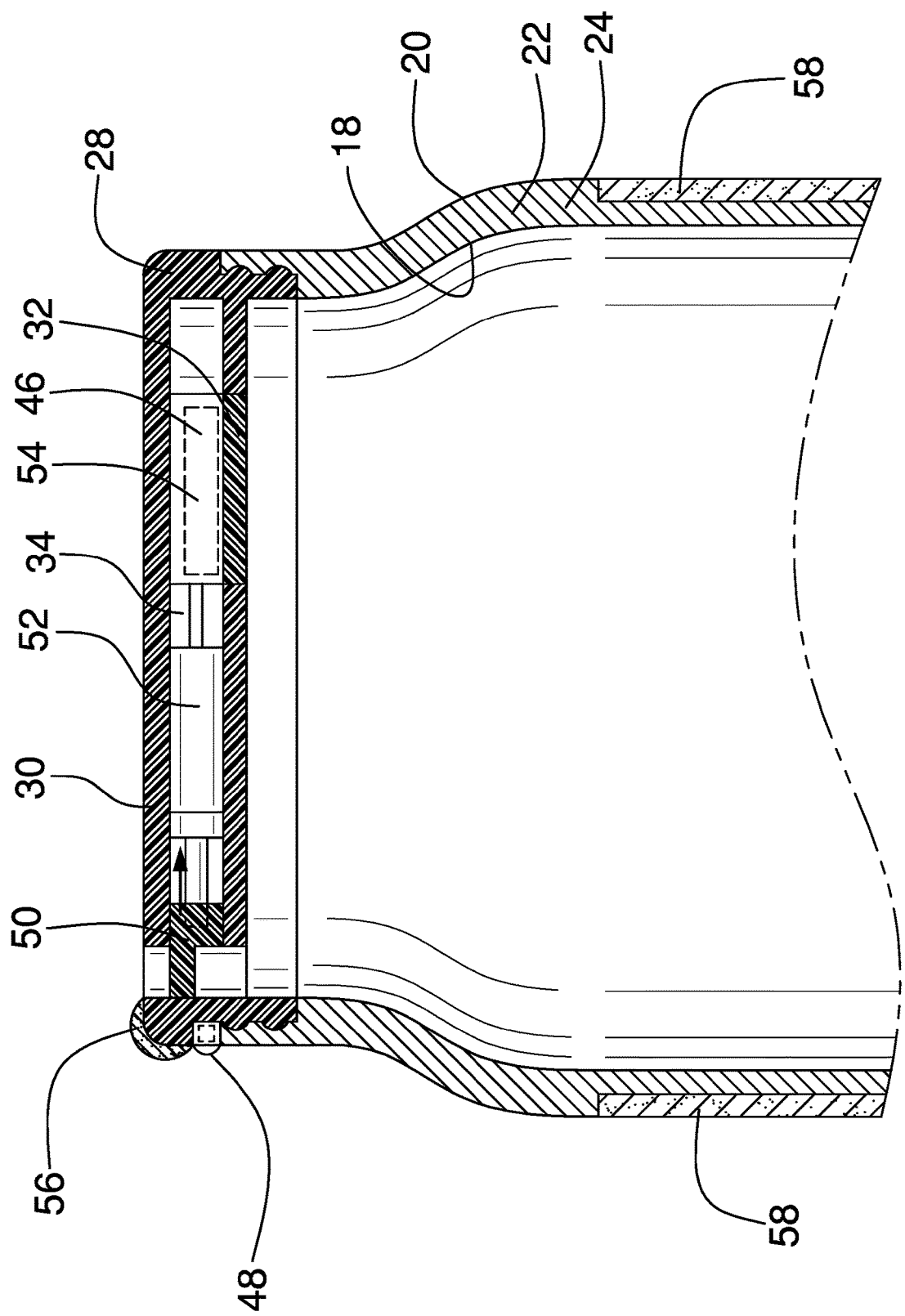
FIG. 4 is a cross-sectional view of an embodiment of the disclosure.
Figure 5:
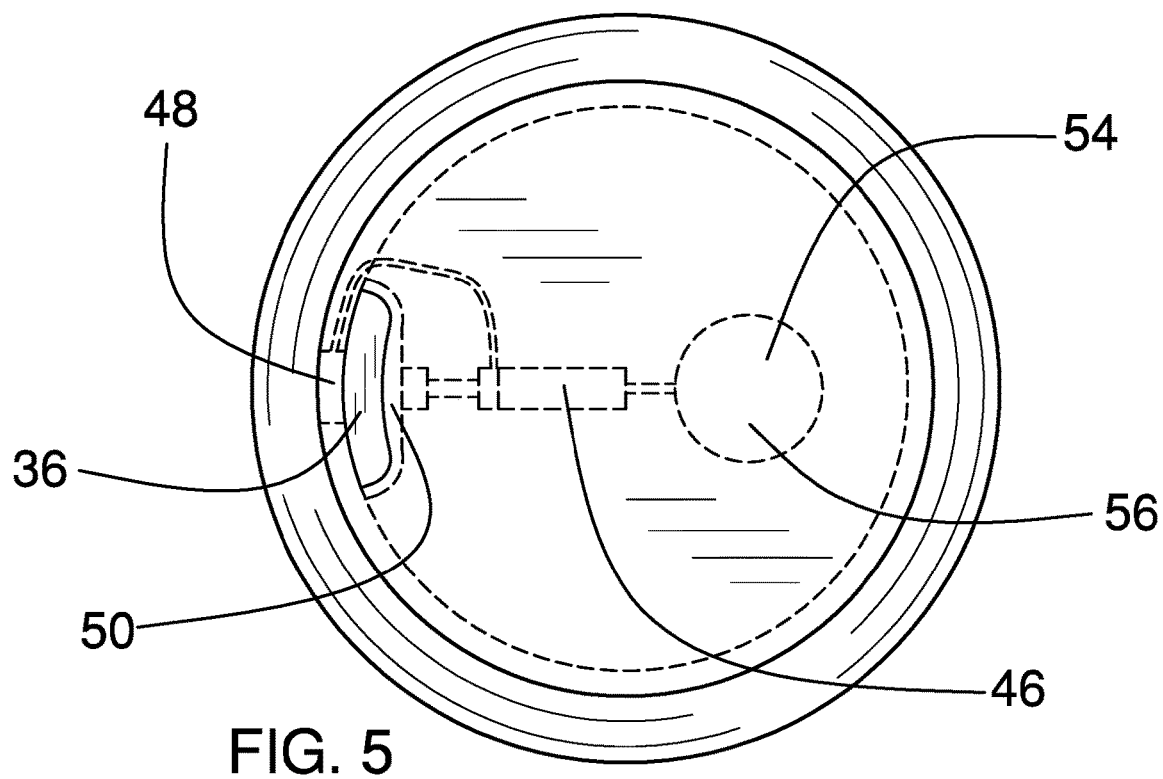
FIG. 5 is a top view of an embodiment of the disclosure.
Figure 6:
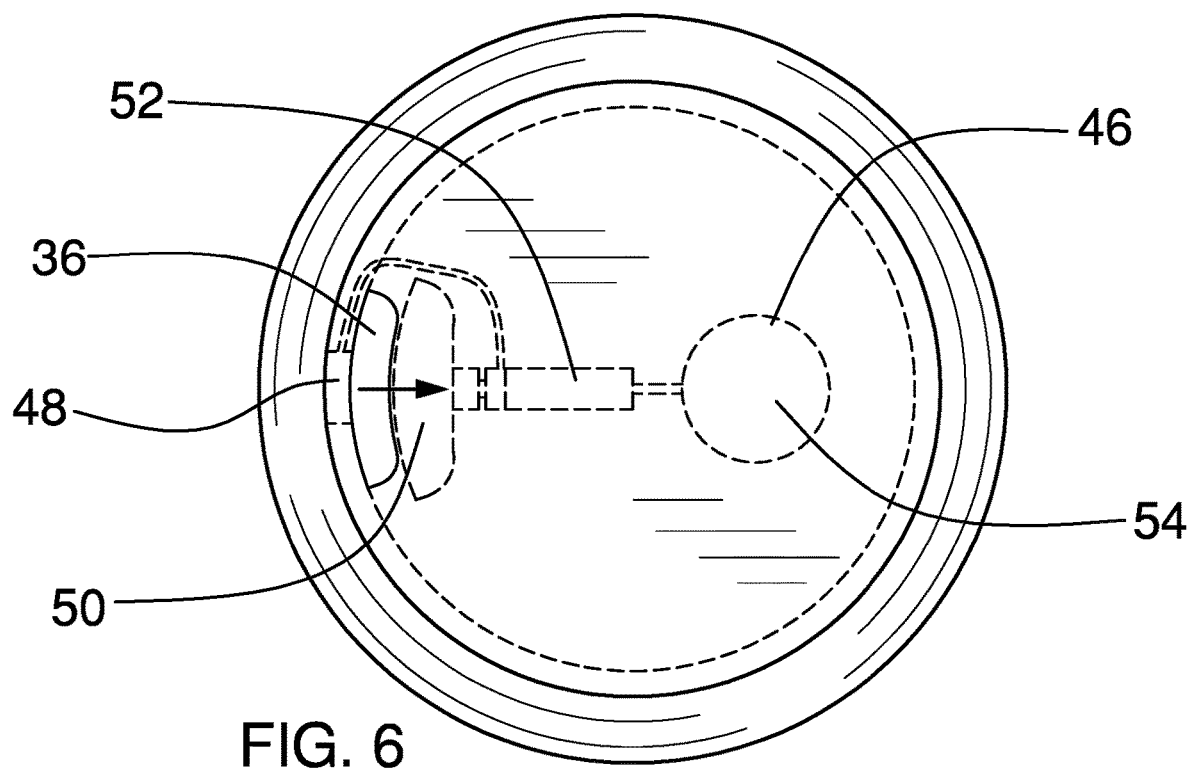
FIG. 6 is a bottom view of an embodiment of the disclosure.

With reference now to the drawings, and in particular to FIGS. 1 through 6 thereof, a new beverage container assembly embodying the principles and concepts of an embodiment of the disclosure and generally designated by the reference numeral 10 will be described.

As best illustrated in FIGS. 1 through 6, the spill resistant beverage container assembly 10 generally comprises a cup 12, which is substantially cylindrically shaped, and a lid 14. The cup 12 is internally threaded proximate to a top 16 of the cup 12. The cup 12 comprises an inner wall 18 and an outer wall 20 that define an internal space 22. The cup 12 may comprise stainless steel, or other rigid material, such as, but not limited to, plastic, wood, ceramic, glass, and the like.

An insulator 24 that is positioned in and substantially occupies the internal space 22 is configured to minimize heat transfer between contents of the cup 12 and a medium that surrounds the cup 12. The insulator 24 may comprise a vacuum or a foamed elastomer, such as, but not limited to, polystyrene, polyurethane, polyisocyanurate, and the like.

A taper 26 is positioned in the cup 12 proximate to the top 16 of the cup 12 so that the cup 12 is circumferentially smaller adjacent to the top 16. The taper 26 is arcuate.

The lid 14 is complementary to the top 16 of the cup 12 so that the lid 14 is positioned to be selectively coupled to the cup 12 to sealably close the top 16. The lid 14 comprises a sidewall 28 that is coupled to and extends between an upper plate 30 and a lower plate 32 to define an interior space 34. An aperture 36 is positioned in the lid 14 proximate to a circumference 38 of the lid 14.

A ring 40 is coupled to and extends from the lower plate 32. The ring 40 is circumferentially smaller than the lower plate 32 so that the ring 40 is complementary to an inner perimeter 42 of the top 16. The ring 40 is externally threaded so that the cup 12 is positioned to threadedly insert the ring 40 to couple the lid 14 to the cup 12 to sealably close the top 16. The ring 40 comprises at least one of rubber, silicone, and plastic so that the ring 40 is positioned to sealably couple to the cup 12.

A detection and access module 44 that is coupled to the lid 14 and positioned in the interior space 34 is configured to detect motion in proximity to the aperture 36, positioning the detection and access module 44 to open the aperture 36 so that the aperture 36 is configured to allow sipping of a beverage that is positioned in the cup 12.

The detection and access module 44 comprises a power module 46, a sensor 48, a panel 50, and an actuator 52. The power module 46 and the actuator 52 are coupled to the lid 14 and are positioned in the interior space 34. The power module 46 comprises a battery 54. The sensor 48 is coupled to the lid 14 proximate to the aperture 36. The sensor 48 may be motion type so that the sensor 48 is positioned to detect motion in proximity to the aperture 36, or may comprise other types of sensing device, such as, but not limited to, tactile sensing devices, proximity sensing devices, and the like. Examples of tactile sensing devices include capacitance switches, resistance touch switches, and piezo touch switches. An example of a proximity sensing device is an infrared light emitting diode and an infrared light detector combination. The sensor 48 is passive infrared type.

The panel 50 is slidably coupled to the lid 14 and selectively extensible from the interior space 34 so that the panel 50 is positioned to selectively close the aperture 36. The actuator 52 is operationally coupled to the power module 46, the sensor 48, and the panel 50 so that sensor 48 is positioned to signal the actuator 52, upon detection of motion in proximity to the aperture 36, so that the actuator 52 is positioned to selectively slide the panel 50 to open the aperture 36. The actuator 52 is linear type.

A pad 56 that is coupled to the circumference 38 of the lid 14 adjacent to the aperture 36 is configured to cushion a pair of lips that contact the lid 14. The pad 56 comprises at least one of rubber, silicone, and plastic.

A grip 58 that is coupled to an exterior surface 60 of the cup 12 is configured to enhance a grasp of a hand of a user upon the cup 12. The grip 58 comprises at least one of rubber, silicone, and plastic. The grip 58 is embedded in the cup 12 so that the grip 58 is flush with the exterior surface 60. The grip 58 comprises a pair of grips 58 that is positioned singly on opposing sides 62 of the cup 12.

A base 64 that is coupled to a bottom 66 of the cup 12 is configured to stabilize the cup 12 on a surface. The base 64 comprises at least one of rubber, silicone, and plastic. The base 64 is circumferentially larger than the bottom 66 of the cup 12.

A cutout 68 is positioned in the lower plate 32 proximate to the battery 54, allowing access to the interior space 34 to change the battery 54. A cover 70 is selectively couplable to the lower plate 32 to close the cutout 68.

In use, the beverage is positioned in the cup 12 and the lid 14 is threadedly coupled to the cup 12 to sealably close the top 16. As the user brings the aperture 36 in proximity to the mouth of the user, the sensor 48 detects the motion and signals the actuator 52 to slide the panel 50 to open the aperture 36, positioning the user to sip the beverage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A spill resistant beverage container assembly comprising:
    a cup;
    a lid complementary to a top of the cup such that the lid is positioned for selectively coupling to the cup for sealably closing the top, the lid comprising a sidewall coupled to and extending between an upper plate and a lower plate defining an interior space;
    an aperture positioned in the lid proximate to a circumference of the lid;
    a detection and access module coupled to the lid and positioned in the interior space wherein the detection and access module is configured for detecting motion in proximity to the aperture positioning the detection and access module for opening the aperture wherein the aperture is configured for sipping of a beverage positioned in the cup; and
    the detection and access module comprising
        a power module coupled to the lid and positioned in the interior space,
        a sensor coupled to the lid proximate to the aperture, the sensor being motion type such that the sensor is positioned for detecting motion in proximity to the aperture,
        a panel slidably coupled to the lid and selectively extensible from the interior space such that the panel is positioned for selectively closing the aperture, and
        an actuator coupled to the lid and positioned in the interior space, the actuator being operationally coupled to the power module, the sensor, and the panel such that sensor is positioned for signaling the actuator upon detection of motion in proximity to the aperture such that the actuator is positioned for selectively sliding the panel for opening the aperture, the actuator being linear type.

2. The assembly of claim 1, further including the cup comprising an inner wall and an outer wall defining an internal space.

3. The assembly of claim 2, further including an insulator positioned in and substantially occupying the internal space wherein the insulator is configured for minimizing heat transfer between contents of the cup and a medium surrounding the cup.

4. The assembly of claim 1, further including the cup comprising stainless steel.

5. The assembly of claim 1, further including a taper positioned in the cup proximate to the top of the cup such that the cup is circumferentially smaller adjacent to the top.

6. The assembly of claim 5, further including the taper being arcuate.

7. The assembly of claim 1, further including the cup being substantially cylindrically shaped.

8. The assembly of claim 7, further comprising:
    the cup being internally threaded proximate to the top of the cup; and
    a ring coupled to and extending from the lower plate, the ring being circumferentially smaller than the lower plate such that the ring is complementary to an inner perimeter of the top, the ring being externally threaded such that the cup is positioned for threadedly inserting the ring for coupling the lid to the cup for sealably closing the top.

9. The assembly of claim 8, further including the ring comprising at least one of rubber, silicone, and plastic such that the ring is positioned for sealably coupling to the cup.

10. The assembly of claim 1, further comprising:
the power module comprising a battery;
a cutout positioned in the lower plate proximate to the battery wherein the cutout is configured for allowing access to the interior space for changing the battery; and
a cover selectively co p ab e to the lower plate for closing the cutout.

11. The assembly of claim 1, further including the sensor being passive infrared type.

12. The assembly of claim 1, further including a pad coupled to the circumference of the lid adjacent to the aperture wherein the pad is configured for cushioning a pair of lips contacting the lid, the pad comprising at least one of rubber, silicone, and plastic.

13. The assembly of claim 1, further including a grip coupled to an exterior surface of the cup wherein the grip is configured for enhancing a grasp of a hand of a user upon the cup, the grip comprising at least one of rubber, silicone, and plastic.

14. The assembly of claim 13, further including the grip being embedded in the cup such that the grip is flush with the exterior surface.

15. The assembly of claim 13, further including the grip comprising a pair of grips positioned singly on opposing sides of the cup.

16. The assembly of claim 1, further including a base coupled to a bottom of the cup wherein the base is configured for stabilizing the cup on a surface, the base comprising at least one of rubber, silicone, and plastic.

17. The assembly of claim 16, further including the base being circumferentially larger than the bottom of the cup.

18. A spill resistant beverage container assembly comprising:
a cup, the cup being substantially cylindrically shaped, the cup being internally threaded proximate to a top of the cup, the cup comprising an inner wall and an outer wall defining an internal space, the cup comprising stainless steel;
an insulator positioned in and substantially occupying the internal space wherein the insulator is configured for minimizing heat transfer between contents of the cup and a medium surrounding the cup;
a taper positioned in the cup proximate to a top of the cup such that the cup is circumferentially smaller adjacent to the top, the taper being arcuate;
a lid complementary to the top of the cup such that the lid is positioned for selectively coupling to the cup for sealably closing the top, the lid comprising a sidewall coupled to and extending between an upper plate and a lower plate defining an interior space;
a ring coupled to and extending from the lower plate, the ring being circumferentially smaller than the lower plate such that the ring is complementary to an inner perimeter of the top, the ring being externally threaded such that the cup is positioned for threadedly inserting the ring for coupling the lid to the cup for sealably closing the top, the ring comprising at least one of rubber, silicone, and plastic such that the ring is positioned for sealably coupling to the cup;
an aperture positioned in the lid proximate to a circumference of the lid;
a detection and access module coupled to the lid and positioned in the interior space wherein the detection and access module is configured for detecting motion in proximity to the aperture positioning the detection and access module for opening the aperture wherein the aperture is configured for sipping of a beverage positioned in the cup, the detection and access module comprising:
a power module coupled to the lid and positioned in the interior space, the power module comprising a battery,
a sensor coupled to the lid proximate to the aperture, the sensor being motion type such that the sensor is positioned for detecting motion in proximity to the aperture, the sensor being passive infrared type,
a panel slidably coupled to the lid and selectively extensible from the interior space such that the panel is positioned for selectively closing the aperture, and
an actuator coupled to the lid and positioned in the interior space, the actuator being operationally coupled to the power module, the sensor, and the panel such that sensor is positioned for signaling the actuator upon detection of motion in proximity to the aperture such that the actuator is positioned for selectively sliding the panel for opening the aperture, the actuator being linear type;
a cutout positioned in the lower plate proximate to the battery wherein the cutout is configured for allowing access to the interior space for changing the battery;
a cover selectively couplable to the lower plate for closing the cutout;
a pad coupled to the circumference of the lid adjacent to the aperture wherein the pad is configured for cushioning a pair of lips contacting the lid, the pad comprising at least one of rubber, silicone, and plastic;
a grip coupled to an exterior surface of the cup Wherein the grip is configured for enhancing a grasp of a hand of a user upon the cup, the grip comprising at least one of rubber, silicone, and plastic, the grip being embedded in the cup such that the grip is flush with the exterior surface, the grip comprising a pair of grips positioned singly on opposing sides of the cup; and
a base coupled to a bottom of the cup wherein the base is configured for stabilizing the cup on a surface, the base comprising at least one of rubber, silicone, and plastic, the base being circumferentially larger than the bottom of the cup.

* * * * *